Oct. 14, 1952     F. T. BARR     2,614,038
PRODUCTION OF SULFUR FREE WATER GAS
Filed Dec. 28, 1945
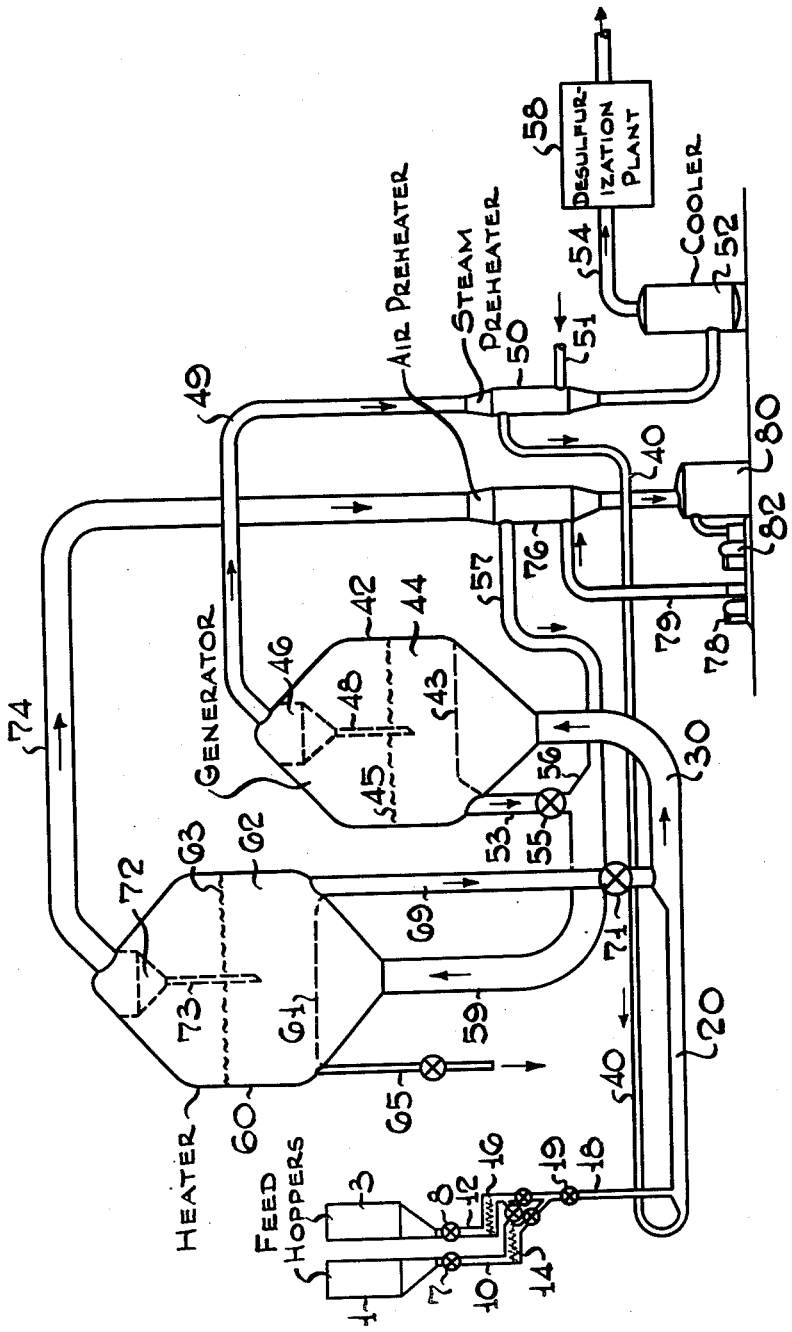
Frank T. Barr Inventor
By P. J. Whelan Attorney Patented Oct. 14, 1952

2,614,038

UNITED STATES PATENT OFFICE 2,614,038

PRODUCTION OF SULFUR FREE WATER GAS

Frank T. Barr, Summit, N. J., assignor to Standard Oil Development Company, a corporation of Delaware Application December 28, 1945, Serial No. 637,615

8 Claims. (Cl. 48—204)

The present invention relates to the production of gases from non-gaseous carbonaceous materials and more particularly to the production of gas mixtures containing CO and $H_2$ from such non-volatile carbonaceous materials as coke, coal, oil shale, heavy oil residues, and the like.

It has long been known that non-volatile fuel materials, such as coke, coal, and the like, may be converted into more valuable gases which can be more easily handled and more efficiently used for a greater variety of purposes. One of the most widely practiced gas-generating conversions is the so-called water gas process in which solid fuels, such as coal or coke of any origin, may be reacted with steam at temperatures of about 1400°–2400° F. to produce water- or producer-gas mixtures of CO and $H_2$ in varying proportions, depending mainly on the conversion temperatures and the feed ratio of steam. The flexibility of the process may be illustrated by a series of possible chemical reactions about as follows:

$$C + 2H_2O \rightarrow 2H_2 + CO_2 - 24{,}700 \text{ cal.}$$
$$C + H_2O \rightarrow H_2 + CO - 32{,}500 \text{ cal.}$$
$$C + CO_2 \rightarrow 2CO - 40{,}200 \text{ cal.}$$

The overall water gas reaction being endothermic, heat must be supplied which is usually accomplished by the combustion of a portion of the carbonaceous feed with an oxidizing gas, such as air and/or oxygen, at about 1600°–3000° F. in accordance with the following reactions:

$$C + O_2 \rightarrow CO_2 + 94{,}400 \text{ cal.}$$
$$C + CO_2 \rightarrow 2CO - 40{,}200 \text{ cal. or}$$
$$2C + O_2 \rightarrow 2CO + 54{,}200 \text{ cal.}$$

The combustion reaction may be carried out either simultaneously with the water gas reaction or alternately in a make and blow fashion.

It will be appreciated from the above that the water gas process permits the production of gas mixtures of widely varying composition and B. t. u. content. The process as such is therefore extremely well suited not only for the production of fuel gases of varying B. t. u. content but also for the production of feed gases for hydrogenation processes and particularly for the catalytic synthesis of hydrocarbons and/or oxygenated organic compounds from CO and $H_2$ which, depending on the products desired, requires $H_2$:CO ratios varying within the wide limits of 0.5–5 volumes of $H_2$ per volume of CO.

However, the technical utilization of the water gas process, particularly for hydrogenation processes and the production of synthesis feed gas, has been appreciably impeded by difficulties encountered in heat supply and continuous operation as well as in the substantial removal of sulfur compounds from the gas, the latter being imperative for the utility of the gas in the hydrocarbon synthesis. The problem of supplying heat of reaction, with continuity of operation, has been satisfactorily solved heretofore by the application of the so-called fluid solids technique wherein the carbonaceous charge is reacted in the form of a dense turbulent mass of finely-divided solids fluidized by the gaseous reactants and products. However, substantial and economic desulfurization of the water gas still constitutes a major problem particularly in practicing the hydrocarbon synthesis based on coal. These difficulties arise from the fact that the gas leaving conventional water gas generators contains two different types of sulfur compounds, namely, $H_2S$ formed by the reaction of sulfur with $H_2$, and organic sulfur compounds such as COS and $CS_2$ as formed, for example, by the reaction of CO and C with $H_2S$, as follows:

$$CO + H_2S \rightarrow COS + H_2$$
$$C + 2H_2S \rightarrow CS_2 + 2H_2$$

These two types of sulfur compounds, due to their different chemical character, cannot be removed by any known single desulfurization treatment. Therefore, it has been the practice heretofore first to remove $H_2S$, for example, by a treatment with alkali, hydrated iron oxides, sodium thioarsenate (Thylox process), sodium phenolate (Koppers process), etc., and then to remove the organic sulfur compounds, for example, either by a conversion into $H_2S$ in the presence of steam and noble metal catalysts followed by a second $H_2S$ removal, or by a single high-temperature catalytic treatment with lead or tin catalysts, etc. The desulfurization procedure requiring two or more separate stages of different design and operating conditions constitutes a heavy load on the economy of any gas utilization depending on sulfur-free fuel gases, of which hydrocarbon synthesis is an outstanding example.

The present invention overcomes the aforementioned difficulties and affords various additional advantages. These advantages, the nature of the invention and the manner in which it is carried out will be fully understood from the following description thereof read with reference to the drawing which shows a semi-diagrammatic view of apparatus particularly adapted to carry out the invention.

It is, therefore, the principal object of my invention to provide an improved process for the production of highly valuable combustible gases from solid carbonaceous materials.

Another object of my invention is to provide economic means for the substantial desulfurization of combustible gases obtained from solid carbonaceous materials.

A still further object of my invention is to provide an improved process for the production of gases containing CO and $H_2$ substantially free of sulfur, from solid carbonaceous materials.

A more specific object of my invention is to provide an improved water gas process for the production of gas mixtures substantially free of sulfur, suitable for the catalytic synthesis of hydrocarbons and/or oxygenated organic compounds from CO and $H_2$.

A still more specific object of my invention is to provide an improved process of the type specified, employing the fluid solids technique.

Other and further objects and advantages will appear hereinafter.

I have found that these objects may be accomplished quite generally by carrying out the gasification of solid carbonaceous materials at temperatures above about 1000° F. in the presence of a catalyst promoting the cracking of organic sulfur compounds. The addition of catalysts of this type causes at the high temperatures of the gas generation zone substantially complete cracking of the organic sulfur compounds with the result that practically all sulfur contained in the gas produced is present in the form of $H_2S$ which may be removed in a single desulfurization stage. In order to prevent a reformation of organic sulfur compounds by the reaction of $H_2S$ with CO, it may be desirable to cool the gas produced rapidly, for example, by chilling or quenching at least to a temperature, such as about 400°–600° F., at which the velocity of this reaction is sufficiently low to eliminate the danger of reformation of the cracked or similar compounds. Lower chilling temperatures may be employed if desired.

The catalyst employed may be selected from those of suitable cracking activity, which include substances containing nickel, copper, silver, gold, calcium, magnesium, titanium, zinc, metal thiomolybdates, etc., or mixtures thereof which may be supported on suitable carrier materials. Certain natural minerals, ores, earths, clays, etc., or separated portions thereof, such as contain oxides or hydrated oxides of iron, aluminum, silicon or the like, are also suitable. Particularly useful as a catalyst with respect to cracking activity, fluidity and availability is bauxite which may be used either alone or in combination with modifying constituents, such as iron oxides, caustic alkalies, alkaline earth, etc. The catalyst may be employed in relatively small proportions varying from about 0.2 to about 10% of the solid carbonaceous charge since the temperature of the gasification reaction is considerably higher than that required for the cracking of organic sulfur compounds.

While the present invention is well applicable to either fixed bed or fluid operation of the gas generation zone, the latter type of operation offers the specific advantages of more uniform catalyst distribution throughout the generator bed and improved contact with the sulfur compounds to be cracked, in addition to the advantages inherent in fluid operation generally. It is also desirable that strongly reducing conditions are maintained in the gas generation zone in order to prevent the formation of elemental sulfur or sulfur oxides. For this reason, the heat required for the gasification reaction is preferably generated by combustion outside the gas generation zone although the oxygen supply required for this purpose is normally insufficient to interfere seriously with the conversion of the organically bound sulfur into hydrogen sulfide. Thus, when applying the fluid solids technique, I prefer to use a system similar to that described in my copending application Serial No. 619,874, filed October 2, 1945, wherein carbonaceous residue from a fluidized gas generator bed is subjected in the form of a fluidized bed to combustion in a separate heater and the sensible heat of hot combustion residue is used to supply the heat required in the gas generator.

No matter which of these specific types of operation is applied in carrying out the present invention, the gas produced will be practically free of organic sulfur compounds in all cases and may thereafter be desulfurized by any conventional single stage processes for the removal of $H_2S$ alone, which have been referred to above. If desired, the catalyst applied in fixed bed or fluid operation may be recovered from the solid gasification residue by known methods of elutriation or flotation followed by a conventional regenerating treatment. It will also be understood that the present invention is equally applicable to the production of low-sulfur water gas, producer gas or fuel gas rich in CO.

Having set forth the general nature and objects, the invention will be best understood from the subsequent more detailed description in which reference will be made to the accompanying drawing which illustrates a system suitable for carrying out a preferred embodiment of the invention.

Referring now in detail to the drawing, carbonaceous solids are ground by any conventional means (not shown) to a fluidizable particle size, for example, of the order of 50% having a size of less than 100 mesh, though small lumps of up to ¼ or ½ inch size may be used. For the purpose of the following description, the carbonaceous material will be referred to as coke and the catalyst as bauxite, but other materials may be used. The properly sized materials are fed in any manner known per se to feed hoppers 1 and 3, respectively. From here they are passed through control valves 7 and 8 and lines 10 and 12 provided with screw feeders 14 and 16 into mixing pipe 18 provided with control valve 19 and then into a dispersing chamber 20. Valves 7 and 8 and screw feeders 14 and 16 are so controlled that a mixture of about 100 parts by weight of coke and one part by weight of bauxite is supplied to dispersing chamber 20. It will be understood, however, that this proportion may vary somewhat, depending on the type of solid materials used, and the proportion of unconvertible material in the carbonaceous solids feed. The solid materials may also be mixed in a single feed hopper 1 from which the mixture may reach dispersing chamber 20 in the manner outlined above. The mixture of solids in dispersing chamber 20 is dispersed in a fluidizing stream of highly heated steam supplied from steam preheater 50 through line 40. The solids in the dispersion are now in the so-called fluidized state in which they are capable of flowing through pipes, valves, etc., similar to a liquid and exhibiting static and dynamic heads. Pressure of the system may be essentially atmospheric, but is preferably kept within the approximate limits of 25 to 75 lbs. per sq. in. gauge to save compression on the gas manufactured. Higher pressures may be used as feasibility and economy of construction techniques allow. From dispersing chamber 20 the fluidized mixture is passed through line 30 into the lower conical portion of a cylindrical gas generator 42, and from there through a distributing grid 43 to the cylindrical portion of generator 42. The gas generator is maintained at a temperature of between about 1400° and 2400° F., preferably about 1600° to 1800° F., at a pressure of about 30 lbs. per sq. in. gauge to permit the water gas reaction to take place, as outlined above, between the steam and the carbon of the fluidized solids mixture which is maintained in a dense ebullient mass 44 forming a level 45 in generator 42. Simultaneously, the organic sulfur compounds in the gas produced are cracked and the sulfur is converted into $H_2S$ by the action of heat and bauxite catalyst. The heat required for the water gas and cracking reaction is supplied by highly heated solid residues recirculated from combustion zone 60 through line 69 at the desired temperature, as will appear more clearly hereinafter. A gas consisting mainly of CO and $H_2$ and practically free of organic sulfur compounds is taken overhead from generator 42 and freed in gas-solids separator 46 from entrained fines which may be returned through pipe 48 to the dense phase 44. The gas leaves separator 46 through line 49 and passes through steam preheater 50 in heat exchange with steam admitted through line 51, to a cooling system 52 which may also be a scrubber for removal of any traces of suspended solids not separated in 46. Steam preheater 50 and cooling system 52 may be so located and designed as to accomplish practically immediate chilling of the gases leaving generator 42 to temperatures below 600° F. Quench cooling by means of liquid sprays may also be utilized. The steam preheated in 50 passes through line 40 to dispersing chamber 20, as outlined above. The cooled gas is passed through line 54 to a conventional desulfurization plant 58 for the removal of $H_2S$ by any known process. Desulfurized gas may be withdrawn from plant 58 for any desired use as a fuel gas, for the synthesis of hydrocarbons and oxygenated organic compounds, etc.

The solid gasification residue is withdrawn from generator 42 through vertical pipe 53 from a point above grid 43 and passed through control valve 55 to dispersing chamber 56 where it is taken up by hot air, oxygen or other oxidizing gas supplied through line 57, as will appear more clearly below. The mixture of solid gasification residue and oxidizing gas passes at about the temperature of the gasification zone through line 59 into the conical lower portion of the cylindrical combustion chamber 60 which has a construction similar to that of chamber 42. The solids-gas mixture enters the cylindrical portion of heater 60 through a distributing grid 61 and forms thereabove a fluidized, dense, ebullient phase 62 having a well-defined upper lever 63.

The temperature of zone 62 is maintained between 1600° and 2500° F., preferably at about 1800° to 1900° F., at a pressure of about 30 lbs. per sq. in. gauge. Solid combustion residues, now consisting essentially of coal ash and bauxite are withdrawn from a point above grid 61 at about the temperature of the combustion zone 62 through vertical pipe 69 provided with control valve 71 to be returned through line 30 to gas generator 42 to supply the heat required in gasification zone 44. The amount of solids recycled to 42 may vary between the approximate limits of 30 to 300 times the carbon content of the solids charged through line 18.

Flue gases are withdrawn overhead from heater 60 through gas-solids separator 72 where they are freed from solid fines. The fines may be returned through vertical pipe 73 to the dense phase 62 or withdrawn from the system. Hot flue gas substantially free of solids is passed through line 74 to air preheater 76 where it preheats the air supplied by compressor 78 through line 79. The preheated air passes through line 57 into dispersing chamber 56, as shown above. The flue gas, if desired after further dust removal in 80, may then be applied to any desired use, such as the operation of a flue gas turbine 82, or discarded.

In case the amount of non-combustible residue formed in heater 60 should be insufficient to provide the necessary amount of heat carrier, inert non-combustible solids may be added in any desired proportion to the solids charge in hoppers 1 and 3. Excessive build-up of inerts in the system may be prevented by the withdrawal of controlled amounts of solid combustion residue through pipe 65 or at any other suitable point of the system.

The embodiment of my invention illustrated by the drawing permits of numerous modifications. For example, heat may be supplied to generator 42 by a partial combustion of carbonaceous material within the gas generation zone by the direct supply of relatively small amounts of an oxidizing gas in such a manner as to maintain overall reducing conditions in generator 42. The conditions of temperature, steam and oxygen supply in generator 42 may also be so controlled as to produce predominantly CO in accordance with the reaction outlined above. The flow of solids through standpipes 18, 53 and/or 69 may be facilitated by the addition of small amounts of fluidizing gas to the solids columns in these pipes. Instead of feeding solids to the bottom of generator 42 by means of a carrier gas, the solids may be supplied by gravity or any suitable mechanical means to any other point of the generator.

It should also be understood that for the purpose of starting up the process illustrated by the drawing the feed gas supplied by compressor 78, the steam supplied through line 51 and/or the solids feed may be preheated to the desired temperatures by any conventional heating means (not shown). Other modifications and variations will appear to those skilled in the art.

My invention will be further illustrated by the following specific examples.

*Example I*

In an operation similar to that illustrated by the accompanying drawing, coal containing 1% sulfur and 10% ash is charged to the unit, the gasification being carried out at 30 pounds pressure and 1800° F., with the fluidized reaction bed 44 of such size that about 10 cubic feet of water gas are produced per hour for each pound of solids held in the bed. The gas passed to the $H_2S$ removal plant contains about 0.25% $H_2S$, and 100–200 parts per million of organic sulfur compounds not removable by the single-stage purification plant.

Example II

In the operation of Example I, 1% by weight of bauxite is charged with the coal. The concentration of bauxite in reaction bed 44 builds up to 5-10% by weight. Without other change in conditions, the gas to the $H_2S$ removal plant now contains only 1-2 parts per million of organic sulfur, and 0.27% $H_2S$ which is completely removed in the single-stage purification plant.

While the foregoing description and exemplary operations have served to illustrate specific applications and results of my invention, other modifications obvious to those skilled in the art are within the scope of my invention. Only such limitations should be imposed on my invention as are indicated in the appended claims.

I claim:

1. In a process for the production of fuel gases free of sulfur compounds by the gasification of solid carbonaceous materials with a reactant gas adapted to convert carbon into carbon monoxide at temperatures of about 1400°-2400° F. followed by the removal of $H_2S$ from the fuel gas produced, the improvement which comprises subjecting said solid materials admixed with about 0.2-1% by weight of a catalyst promoting the cracking of organic sulfur compounds, to said gasification at said temperatures to produce a fuel gas containing $H_2S$, but free of organic sulfur compounds, quenching said fuel gas to a temperature not exceeding 600° F. so as to prevent the formation of organic sulfur compounds in said fuel gas, subjecting said quenched fuel gas to a treatment adapted to remove $H_2S$ therefrom, and recovering from said treatment a fuel gas essentially free of sulfur compounds.

2. The process of claim 1 in which said reactant gas comprises steam and said fuel gas is water gas.

3. The process as claimed in claim 1 in which said catalyst is bauxite.

4. The process as claimed in claim 1 in which said solid carbonaceous material and said catalyst are subjected to said gasification reaction in the form of a dense, turbulent, fluidized bed of finely-divided solids.

5. In the process for the production of mixtures of CO and $H_2$ substantially free of sulfur, from solid carbonaceous materials by a gasification reaction with steam at temperatures of about 1400°-2400° F. followed by a desulfurization of the resulting gas, the improvement which comprises carrying out said gasification reaction in a gasification zone in the presence of about 0.2-1% by weight of a catalyst promoting the cracking of organic sulfur compounds so as to convert organically bound sulfur into $H_2S$, maintaining said solid carbonaceous material and said catalyst in the form of a dense, turbulent, fluidized mass of solids in said gasification zone, withdrawing a gas containing CO, $H_2$ and small amounts of $H_2S$ from said gasification zone, quenching said withdrawn gas to a temperature not exceeding 600° F. so as to prevent the formation of organic sulfur compounds in said withdrawn gas and removing $H_2S$ from the quenched gas so as to produce a gas essentially free of sulfur compounds.

6. The process as claimed in claim 5 in which heat required by said gasification reaction is generated by a partial combustion of said carbonaceous material with free oxygen within said zone.

7. The process as claimed in claim 5 in which heat required by said gasification reaction is generated by the partial combustion of said carbonaceous material with free oxygen in a dense turbulent bed of fluidized solids maintained in a separate heater and said heat is supplied to said gasification zone in the form of sensible heat of solid combustion residue withdrawn from said heater.

8. The process as claimed in claim 5 in which said catalyst is bauxite.

FRANK T. BARR.

REFERENCES CITED

The following references are of record in the file of this patent:

UNITED STATES PATENTS

| Number | Name | Date |
| --- | --- | --- |
| 1,495,776 | Burdick | May 27, 1924 |
| 1,687,118 | Winkler | Oct. 9, 1928 |
| 1,901,170 | Karrick | Mar. 14, 1933 |
| 2,436,938 | Scharmann et al. | Mar. 2, 1948 |
| 2,482,187 | Johnson | Sept. 20, 1949 |

FOREIGN PATENTS

| Number | Country | Date |
| --- | --- | --- |
| 143,641 | Great Britain | May 28, 1920 |

OTHER REFERENCES

Berkman et al., "Catalysis," page 931.

Morgan, "A Testbook of American Gas Practice," 2nd Edition, vol. I, pages 401, 804.

Grant, "Hackh's Chemical Dictionary," 3rd Edition, page 169.